United States Patent
Claux et al.

(10) Patent No.: US 9,922,309 B2
(45) Date of Patent: Mar. 20, 2018

(54) ENHANCED ELECTRONIC COMMUNICATION DRAFT MANAGEMENT

(75) Inventors: David Claux, Redmond, WA (US); Kristian Lennart Magnus Andaker, Redmond, WA (US); Jason Todd Henderson, Tacoma, WA (US); Oleg Ouliankine, Redmond, WA (US); Dmitry Alexeenko, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 13/617,755

(22) Filed: Sep. 14, 2012

(65) Prior Publication Data

US 2013/0318176 A1    Nov. 28, 2013

Related U.S. Application Data

(60) Provisional application No. 61/651,661, filed on May 25, 2012.

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC ....... H04L 51/12; H04L 51/22; H04L 12/585; H04L 51/08; H04L 12/589; H04L 51/00; H04L 51/16; H04L 29/06408; H04L 41/026; H04L 65/4023
USPC ....................................................... 709/206
See application file for complete search history.

(56) References Cited

U.S. PATENT DOCUMENTS

| 7,139,800 | B2 | 11/2006 | Bellotti et al. |
| 7,395,500 | B2 | 7/2008 | Whittle et al. |
| 7,657,838 | B2 | 2/2010 | Daniell et al. |

(Continued)

FOREIGN PATENT DOCUMENTS

| CN | 1521667 A | 8/2004 |
| CN | 102355529 A | 2/2012 |
| KR | 10-2010-0000753 A | 1/2010 |

OTHER PUBLICATIONS

"International Search Report & Written Opinion for PCT Patent Application No. PCT/US2013/041481", dated Jul. 16, 2014, Filed Date: May 17, 2013, 12 Pages.

(Continued)

*Primary Examiner* — Sm Rahman
(74) *Attorney, Agent, or Firm* — Merchant & Gould

(57) ABSTRACT

Draft management for new electronic communication messages in a mailbox folder is provided. When a user selects to create a new email message, a draft of the new message may appear in a list view of one or more of the user's mailbox folders. The list view may display aggregated contents from both a mailbox folder and the drafts folder. Drafts may be identified as draft messages so that it may be easy for the user to distinguish between draft messages and other email messages. When a draft is deleted or when a draft is sent, it may be removed from the list view. Additionally, selection controls may be provided in the user interface to sort email items by groupings. Selection of a drafts selection control may cause a display of the draft items in the user's email account.

20 Claims, 10 Drawing Sheets

(56) References Cited

U.S. PATENT DOCUMENTS

| | | | |
|---|---|---|---|
| 7,886,000 B1* | 2/2011 | Polis | H04L 67/2833 |
| | | | 455/466 |
| 7,908,647 B1* | 3/2011 | Polis | G06F 17/30997 |
| | | | 713/151 |
| 2005/0193067 A1* | 9/2005 | Ferguson | 709/206 |
| 2006/0224674 A1 | 10/2006 | Buchheit et al. | |
| 2007/0143699 A1 | 6/2007 | Jaeger | |
| 2008/0005247 A9 | 1/2008 | Khoo | |
| 2008/0147818 A1 | 6/2008 | Sabo | |
| 2008/0208984 A1 | 8/2008 | Rosenberg et al. | |
| 2009/0049140 A1* | 2/2009 | Stoddard | G06Q 10/107 |
| | | | 709/206 |
| 2009/0164923 A1* | 6/2009 | Ovi | G06F 3/04817 |
| | | | 715/764 |
| 2009/0216843 A1* | 8/2009 | Willner | G06Q 10/107 |
| | | | 709/206 |
| 2009/0319911 A1 | 12/2009 | McCann et al. | |
| 2010/0057864 A1 | 3/2010 | Laird-McConnell | |
| 2010/0070844 A1 | 3/2010 | Aymeloglu | |
| 2010/0070880 A1 | 3/2010 | Chinta | |
| 2010/0162168 A1* | 6/2010 | Lee et al. | 715/821 |
| 2010/0313125 A1 | 12/2010 | Fleizach et al. | |
| 2010/0313165 A1 | 12/2010 | Louch et al. | |
| 2011/0099242 A1 | 4/2011 | Madnani | |
| 2011/0231499 A1 | 9/2011 | Stovicek et al. | |
| 2011/0258264 A1 | 10/2011 | Bremner et al. | |
| 2011/0258559 A1 | 10/2011 | You et al. | |
| 2012/0084644 A1 | 4/2012 | Robert et al. | |
| 2012/0185781 A1 | 7/2012 | Guzman et al. | |
| 2013/0086175 A1* | 4/2013 | Claux | G06F 17/211 |
| | | | 709/206 |
| 2015/0256495 A1 | 9/2015 | Claux et al. | |

OTHER PUBLICATIONS

Google Apps; "Life after Microsoft Outlook Google™ Apps"; Oct. 2010; accessed at http://support.gappsmasters.com/attachments/token/olddn2xgkyrfmz6/?name=Life_After_Outlook_gmail.pdf.

Chinese First Office Received for Patent Application No. 201380027401.X, dated Oct. 9, 2016, With English Translation, 13 pages.

"Office Action Issued in European Patent Application No. 13726949.4", dated Aug. 1, 2016, 6 Pages.

Gmail Tips and Tricks—Saving your messages while composing (Draft) Posted by DSP—Nov. 12, 2008 http://blog.consultmirror.com/2008/11/Gmail-Blog-tips-and-tricks-saving-your-messages-while-composing-draft/.

Bales, David, Gmail (Basic HTML) Guide published Dec. 21, 2007 http://web.archive.org/web/20071221100918/http://vip.chowo.co.uk/wpcontent/uploads/jaws/Google-Mail-Basic-HTML-Guide.html.

Official Gmail Blog, Posted: Thursday, Aug. 4, 2011 http://gmailblog.blogspot.com/2011/08/new-in-labs-preview-pane.html.

"Supplementary European Search Report Received for European Patent Application No. 13726949.4", dated Nov. 24, 2015, 6 Pages.

"A Preview of Gmail's New Look", Published on: Jun. 30, 2011, Retrieved from: <<http://gmailblog.blogspot.in/2011/06/preview-of-gmails-new-look.html>>, 6 Pages.

"Gmail Draft Email", Published on: Apr. 27, 2012, Retrieved from: <<https://www.youtube.com/watch?v=i3kFLiMbEsY>>, 1 Page.

"Office Action Issued in Japanese Patent Application No. 2015-514066", dated May 26, 2017, 11 Pages.

Tsuchida, Yoneichi, "Talented Pocket+ Gmail", In Impress Japan, Co., Ltd., Sep. 21, 2009, 7 Pages.

Yamaji, et al., "Gmail Super Business Skills", In Kiminari Takahira of Aspect Co., Ltd, Jun. 8, 2009, 3 Pages.

Hara, Yukihiro, "More Convenient Utilization of Gmail ~ From basics to applications ~", In Nikkei Personal Computer, published by Nikkei BP, Co., Ltd., Apr. 5, 2012, 3 Pages.

"Second Office Action Issued in Chinese Patent Application No. 201380027401.X", dated Jul. 5, 2017, 9 Pages.

Nicalaou, Alex, "Gmail on the iPad", Official Gmail Blog, Located online at: https://gmail.googleblog.com/2010/04/gmail-on-ipad.html, Apr. 3, 2010, 3 pages.

"Office Action Issued in Chinese Patent Application No. 201380027401.X", dated Jan. 2, 2018, 6 Pages.

* cited by examiner

FIG 4

| MAIL | CALENDAR | PEOPLE | TASKS |

☒ New  all  unread  to me  flagged  unsent  drafts

INBOX — CONVERSATIONS BY DATE

Jennifer Black; Ann Smith; Bob — 415
Lunch — 12:15p

[Draft] — 315
Flight to DC
Could you please send me my itinerary?  10:20a

Bob Green
Softball
We are practicing tonight at the park  9:40a

ACME, Inc.
Shipping Confirmation
Your package has shipped. Your can

FAVORITES
Inbox 3
Drafts
Sent Items

ED BROWN
Inbox 3
Personal
Work
Deleted Items 120

— Jennifer Black    ←REPLY  ←REPLY ALL  →FORWARD  mark read
to: Ann Smith, Bob Green
Works for me!
-Jen — Ann Smith    ←REPLY  ←REPLY ALL  →FORWARD  mark read
to: Bob Green, Jennifer Black
How does tomorrow look?
-Ann — Jennifer Black    ←REPLY  ←REPLY ALL  →FORWARD  mark read

FIG 5

| MAIL | CALENDAR | PEOPLE | TASKS | all  unread  to me  flagged  unsent  drafts [4] — 505

⊠ New

FAVORITES
110 — Inbox 7 — 110 INBOX
145 — Drafts
150 — Sent Items

ED BROWN
155 — Inbox 7
160 — Personal
170 — Work
 — Deleted Items

215 — [Draft]   DRAFTS BY DATE
310 — Flight to DC    315 — 12:15p
       Could you please send me my itinerary?

215 — [Draft]                 11:48a
       Softball schedule
       Attached is a list of tournaments we are 215 — [Draft]                 6:05a
       This weekend
       I'm thinking about going to the mountains 215 — [Draft]              Sun 9:15p
       Need your help
       The project is developing into a bigger pro

— 305

✉ SEND  ✗DISCARD  ○INSERT   🖫 to: David Indigo
cc:
Subject: Flight to DC

| Segoe UI ∨ | 10 ∨ | B  I  U |

Could you please send me my itinerary?

If I have an aisle seat, can you see if there is a window seat available?

Thanks-
Ed
                              — 210

105               130

ENHANCED ELECTRONIC COMMUNICATION DRAFT MANAGEMENT

CROSS-REFERENCE TO RELATED APPLICATIONS

The present application claims priority to U.S. Provisional Patent Application No. 61/651,661 titled "Enhanced Electronic Communication Draft Management" filed May 25, 2012, the disclosure of which is hereby incorporated by reference in its entirety.

BACKGROUND

Oftentimes when using an email client application, a user may compose an email and save it as a draft so he can continue working on the email at a later time. The draft is then saved in a drafts folder in the user's mailbox. To continue working on a draft, the user may have to select the drafts folder, find the desired draft and open it. Having to switch to or open another folder and therefore lose the context of what a user is working on to be able to continue working on a draft may be perceived as inefficient and may hamper productivity.

Some email client applications allow for management of drafts of replies to conversations by ways of a conversation tree and conversation view wherein all messages in a conversation string across all folders in a user's mailbox appear in a list view and/or reading pane.

It is with respect to these and other considerations that the present invention has been made.

SUMMARY

Embodiments of the present invention solve the above and other problems by providing draft management for new electronic communication messages in a mailbox folder. According to embodiments, when a user selects to create a new email message, a draft of the new message may be stored in the user's drafts folder and may appear in a list view of the user's inbox or other mailbox folder. When a draft is deleted or when a draft is sent, it may be removed from the list view of the inbox or other mailbox folder. The list view may display aggregated contents from both the selected mailbox folder and the drafts folder.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 4 is an illustration of an example screenshot showing a draft listing appearing in the user's inbox and positioned below a received email message;

FIG. 5 is a flow chart of a method for providing draft management for new electronic communication messages in an inbox folder of an email client application;

DETAILED DESCRIPTION

Figure 1:
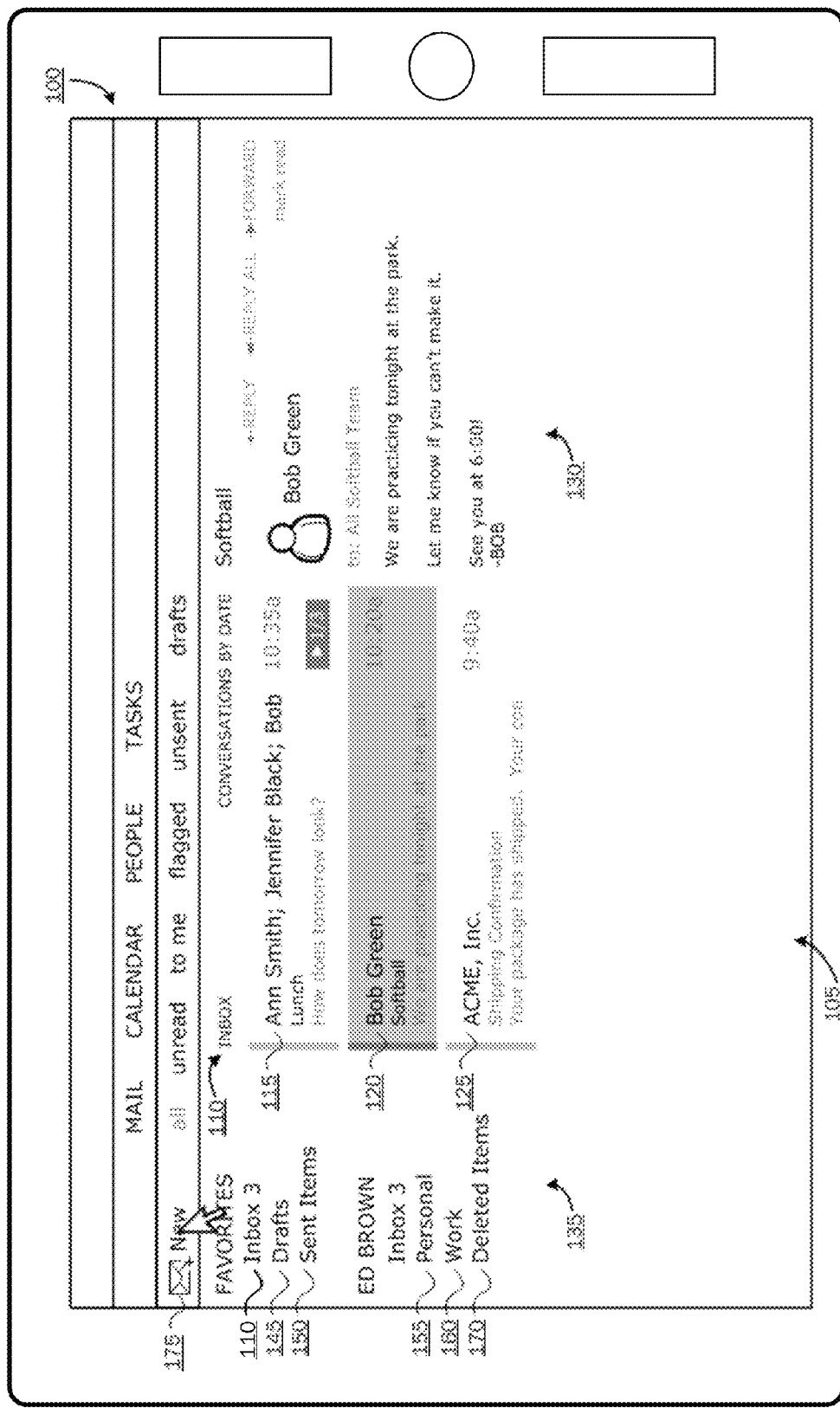
FIG. 1 is an illustration of an example screenshot showing an email client application user interface displayed on a tablet-type computing device.

As briefly described above, embodiments of the present invention are directed to providing draft management for new electronic communication messages in a mailbox folder of an email client application.

With current systems, when a user creates an email, the system may automatically save a draft of the email after a predetermined amount of time or the user may manually save the email as a draft. When an email is saved as a draft, it may be saved to a drafts folder. If the user closes the email and later wants to reopen it, he may need to go to the drafts folder, find the email, then select it to reopen it. As can be appreciated, this can be inefficient. Additionally, when utilizing an email client application, oftentimes users spend most of their time in the inbox or other mailbox folders. Thus, when a draft email is saved in the drafts folder, the user may easily forget about the draft and forget to complete and send it.

Embodiments of the present invention provide management of email drafts such that when a user selects to create a new email message, a draft of the new message may appear in a list view of the user's inbox or other mailbox folder. The list view may display aggregated contents from both a selected mailbox folder and the drafts folder. Drafts may be clearly identified as draft messages so that it may be easy for the user to distinguish between draft messages and other email messages. When a draft is deleted or when a draft is sent, it may be removed from the list view of a mailbox folder.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 illustrates an example screenshot 100 showing an email client application user interface 105. For purposes of illustration, the screenshot 100 is shown on a display surface of a tablet-type computing device 918B. As should be appreciated, a tablet-type computing device 918B is but one of a number of computing devices that may be used for displaying the screenshot 100 as described herein. As illustrated, contents of a user's inbox 110 are displayed in a list view in the user interface 105. The user's inbox 110 may include a listing of items (e.g., emails 115,120,125) in the inbox folder 110 of the user's email account. According to an embodiment and as will be described in greater detail below, the inbox folder 110 may be an aggregated folder including received email items that have not been moved into another email folder and draft email messages that have not been sent. The user interface 105 may include a navigation pane 135 which may include a listing of one or more mailbox folders 110,145,150,155,160,170 in a user's email account. As should be appreciated, the mailbox folders 110,145,150,155,160,170 illustrated in FIGS. 1-5 are for purposes of illustration and are but a few of a number of various types of mailbox folders that may be included in an email account. An email account may contain more or less mailbox folders 110,145,150,155,160,170 and may differ in folder types than what is illustrated. According to embodiments, each of the one or more mailbox folders 110, 145, 150,155,160,170 in an email account may include email items saved to the folder and draft email messages that have not been sent. The user interface 105 may also include a reading pane 130 which may be utilized to display a selected item in a user's inbox 110 or other selected mailbox folder without having to open the item. For example, as illustrated in FIG. 1, a selected email 120 in a user's inbox 110 is displayed in the reading pane 130.

Figure 2:
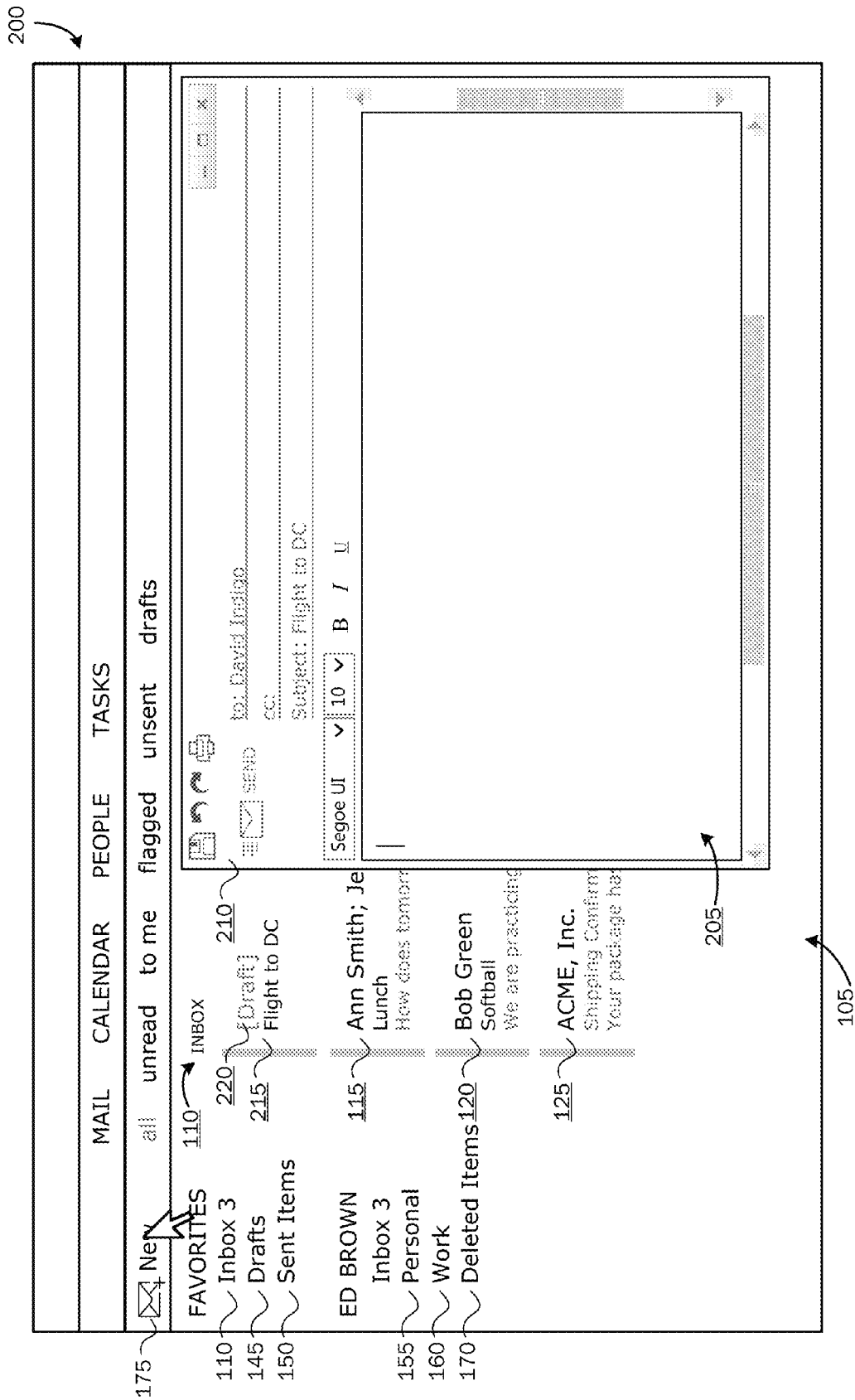
FIG. 2 is an illustration of an example screenshot showing a draft of a new email message.

Referring now to FIG. 2, an example screenshot 200 showing a draft of a new email message is illustrated. As shown in FIG. 2, upon receiving an indication of a selection of a functionality to create a new email, for example, a selection of a new email functionality control 175, a user may be presented with a user interface element 205 within which a new email message may be composed. According to embodiments, when a new email message 210 is being composed, the draft of the new message 210 may be listed as an item in the user's inbox 110 and in other mailbox folders 145,150,155,160,170 in a user's email account. A draft item 215 representing the draft of the new message 210 may be presented in the user's inbox 110 and other mailbox folders 145,150,155,160,170 and may be listed among other items (emails 115,120,125) in the user's mailbox folders. According to one embodiment, the draft item 215 representing the draft of the new message 210 may be presented as soon as an indication of a selection to create a new email message is received. According to another embodiment, the draft item 215 representing the draft of the new message 210 may be presented a predetermined time after a user starts to compose the new email message 210. According to another embodiment, the draft item 215 representing the draft of the new message 210 may be presented after a user selects to save a draft of the new email message 210. The draft item 215 representing the draft of the new message 210 may include an identifier 220 that distinguishes the email message as a draft email message. For example, and as illustrated in FIG. 2, the identifier 220 may be the word "draft" within brackets. The user may choose to close the new email message 210 without sending it. Until the email message 210 is deleted or sent, the draft item 215 representing the draft of the new message 210 and the identifier 220 may remain displayed in the user's mailbox folder 110,145,150, 155,160,170.

According to one embodiment, a draft item 215 representing a draft of a new message 210 may appear in the order in which it is created and in the order in which new messages are received. For example, when a user saves a draft email message 210, the draft item 215 may appear at the top of the user's mailbox folder 110,145,150,155,160,170. As illustrated in FIG. 2, the draft item 215 appears at the top of the user's inbox folder 110. If the user receives a new email message after he has saved the draft 210, a new email item may appear above the draft item 215. According to another embodiment, draft items 215 may remain listed at the top of a user's mailbox folder 110,145,150,155,160,170 even if new messages are received or saved to the folder after a draft 210 is saved. As can be appreciated, settings may be provided to allow a user to customize the display of draft items 215 in his mailbox folder 110,145,150,155,160,170 as desired by the user.

Figure 3:
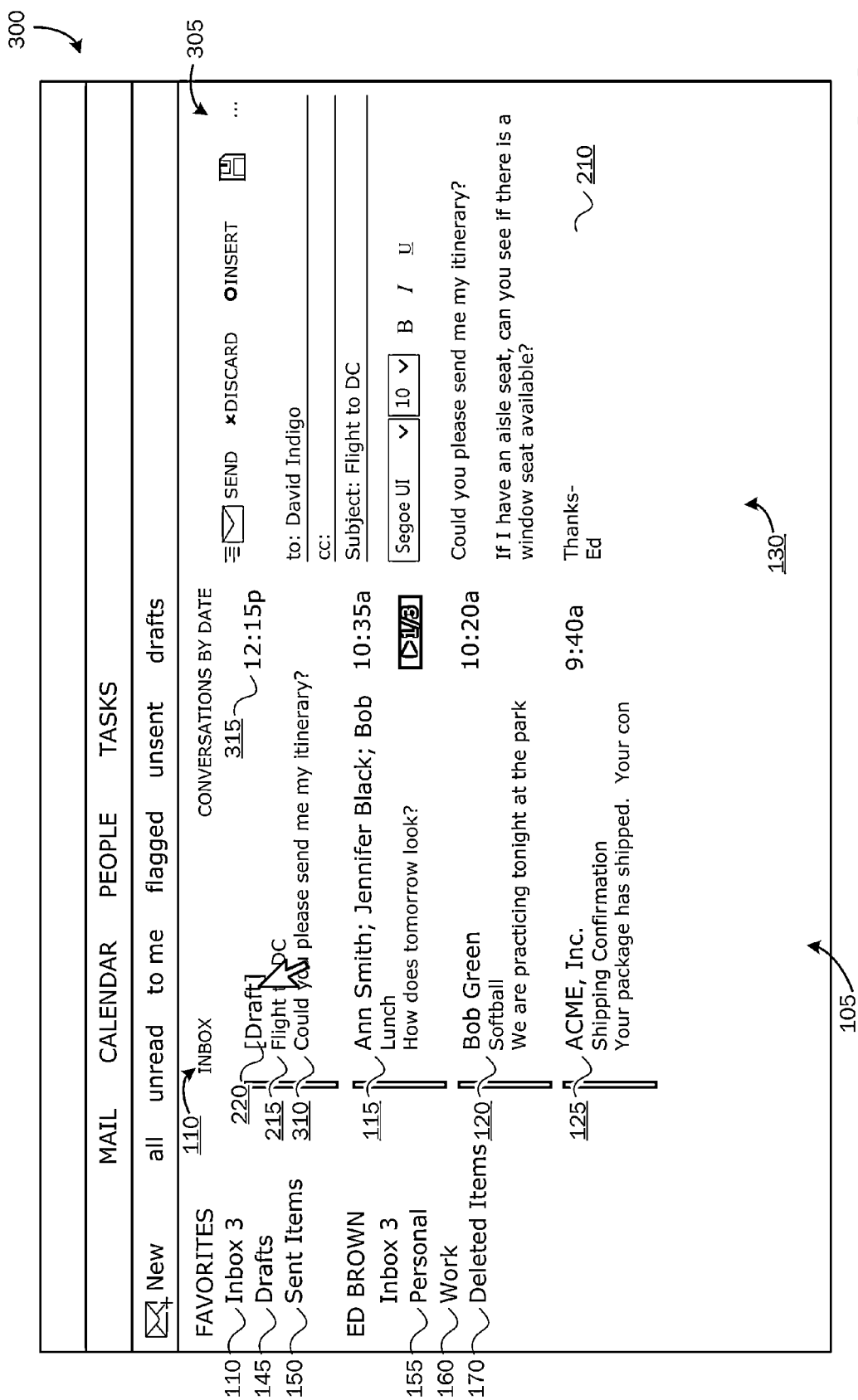
FIG. 3 is an illustration of an example screenshot showing an inline compose form displayed in a reading pane in an email client application user interface.

Referring now to FIG. 3, an example screenshot 300 of an inline compose form 305 displayed in the reading pane 130 in the email client application user interface 105 is illustrated. According to embodiments, when a user selects a draft item 215 listed in a mailbox folder 110, 150,155,160, 170, the draft email message 210 may be reopened to the user without the user having to go to the draft folder 145. According to one embodiment, the draft email message 210 may be reopened in a new window. According to another embodiment and as illustrated in FIG. 3, the draft email message 210 may be reopened and displayed in an inline compose form 305 displayed in the reading pane 130 in the email client application user interface 105. The user may continue drafting the email message 210 and then may either delete the message, send the message, or save the draft again. If the user chooses to save the draft email message 210, the draft item 215 may appear at the top of the user's mailbox folder 110,145,150,155,160,170 and may include any modifications such as the time of the save operation 315, subject of the email 210, and email content. For example and as illustrated, upon adding content to the draft email message 210 and resaving the draft, the draft item 215 appears at the top of the user's inbox 110, includes a new time of save 315, and includes a preview line 310 showing a portion of the beginning of the content of the draft email message 210.

Referring now to FIG. 4, an example screenshot 400 of the draft listing 215 appearing in the user's inbox 110 and positioned below a received email message 405 is illustrated. According to an example of one embodiment and as shown in FIG. 4, an email message 405 is received by the user's email account at 12:18 PM 415. The email 405 is listed in the user's inbox 110, and because it is received after the draft email message 210 has been saved (at 12:15 PM 315), the received email 405 is listed in the inbox 110 above the draft listing 215 representing the draft email message 210. Likewise, if an email message 405 is received and saved to a mailbox folder 155,160 after a draft email message 210 has been saved, the received and saved email 405 may be listed in the mailbox folder 155,160 above the draft listing 215 representing the draft email message 210.

According to embodiments, and with reference to FIG. 5, selection controls may be provided in the user interface 105 to sort email items by various classifications or groupings. For example, a drafts selection control 505 may be provided. Selection of the drafts selection control 505 may cause a display of only the draft items 215 in the items in a currently selected mailbox folder 110,145,150,155,160,170. As can be appreciated, other functionality controls may be provided for causing a display of draft items 215. According to another embodiment, a selection of or a focusing of a cursor over a selection control may provide a drop down listing of items classified in the grouping of the selection control. For example, upon selection of a drafts selection control 505, a drop down menu may be displayed including a listing of the drafts in the user's email account.

Figure 6:
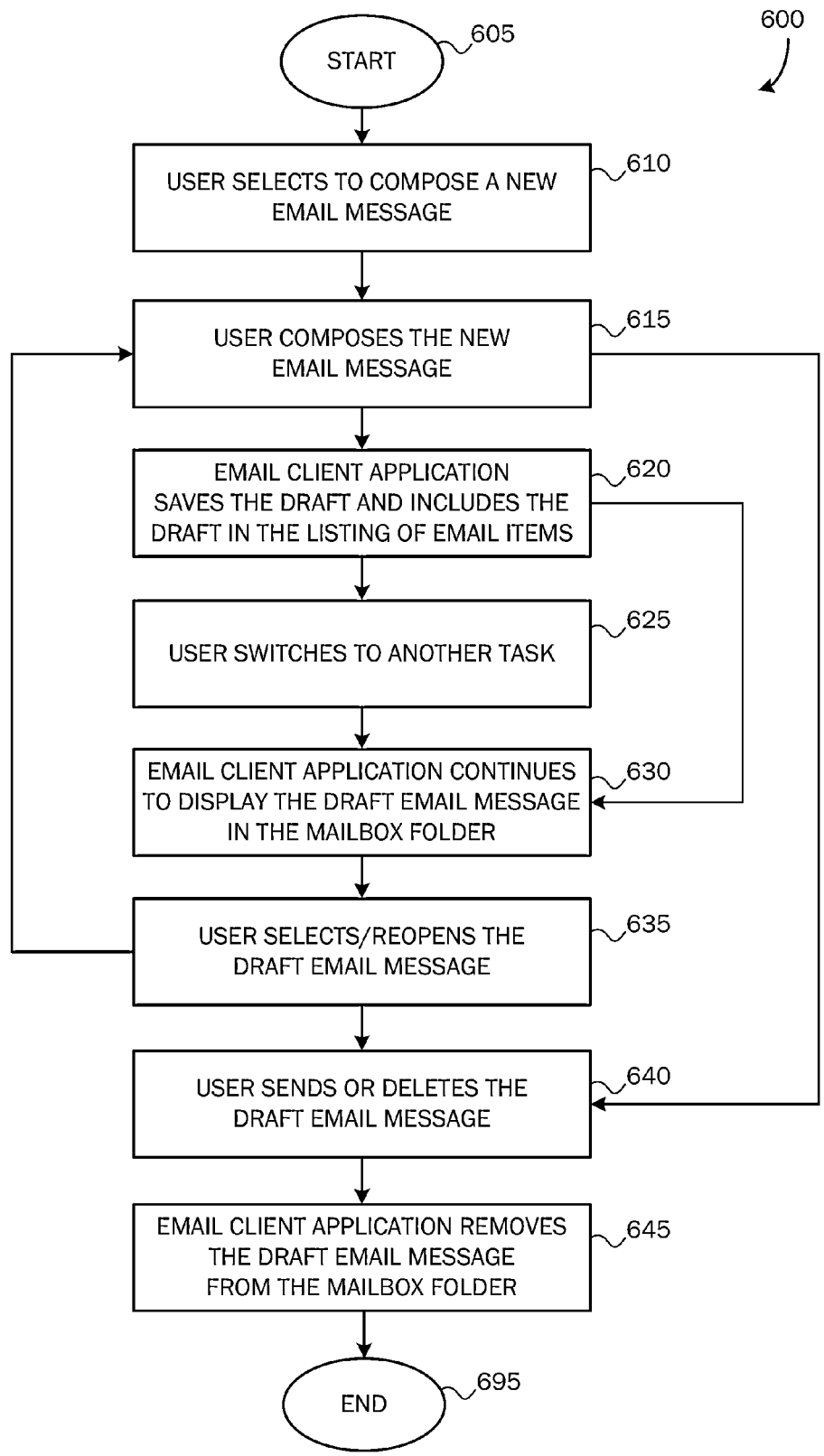
FIG. 6 is an illustration of an example screenshot showing items of a user's inbox sorted by draft email messages.

Referring now to FIG. 6, a method 600 for providing draft management for new electronic communication messages in a mailbox folder 110,145,150,155,160,170 is illustrated. The method 600 starts at OPERATION 605 and proceeds to OPERATION 610 where a selection is made by a user to compose a new email message 210. Various methods may be used to select to compose a new email message 210, for example, a selection of a new email functionality control 175, keyboard shortcut keys, etc.

The method 600 proceeds to OPERATION 615 where the user composes the new email message 210. Composing a new email message may include adding content to the message, such as adding one or more recipients of the email message 210, adding a subject to the message, composing the body of the email message, or, according to an embodiment, may include simply opening the new email message.

At OPERATION 620, a draft of the email message 210 is saved. According to embodiments, the save operation may be resultant of a selection of a save command, may occur after the selection is made by the user to compose a new email message 210 (610), may occur after a predetermined amount of time has elapsed during the composition of the new email message 210 (615), or may occur when a user closes the new email message and/or switches to another task. According to one embodiment, the draft email message 210 is saved to a drafts folder 145. According to another embodiment, the draft email message 210 is saved to a mailbox folder 110,150,155,160,170. According to another embodiment, the draft email message 210 is saved to an aggregated folder comprising contents of the drafts folder 145 and the inbox folder 110. According to another embodiment, the draft email message 210 is saved to one of various aggregated folders, wherein an aggregated folder comprising contents of the drafts folder 145 and one of one or more mailbox folders 150,155,160,170.

According to embodiments, the draft email message 210 may be included in a listing of email items 115,120,125. That is, a draft item 215 representing the draft email message 210 may be displayed in a list view of the user's inbox 110 or a list view of a currently selected mailbox folder 150,155,160,170 and may include an identifier 220 that indicates that the represented email message is a draft email message.

According to an embodiment, a draft item 215 may appear in the order in which it is created and in the order in which new messages are received or saved to a mailbox folder. For example, when a user saves a draft email message 210, the draft item 215 may appear at the top of the user's inbox 110. If the user receives a new email message after he has saved the draft email message 210, an indication of the new email may be displayed above the draft item 215 in the listing of inbox items. According to another embodiment, draft items 215 may remain listed at the top of a user's mailbox folder 110,150,155,160,170 even if new messages are received or saved to the folder after a draft email message 210 is saved. As can be appreciated, settings may be provided to allow a user to customize the display of draft items 215 in his inbox 110 or other mailbox folder 145,150,155,160,170 as desired by the user.

At OPERATION 625, the user may close the draft email message 210 and switch to another task. At OPERATION 630, the email client application continues to list the draft of the new message 210 as an item in the user's mailbox folder 110,145,150,155,160,170. The method 600 proceeds to OPERATION 635 where the user selects and reopens the draft email message 210. The user may continue to compose the message 210 (615) or the method may proceed to OPERATION 640 where the user may send or delete the draft email message 210. If the user continues to compose the draft email message 210, the draft may be resaved (620) and according to an embodiment, the draft item 215 may be moved to the top of the list of items (emails 115,120,125).

After sending or deleting the draft email message 210 (640), at OPERATION 645 the draft item 215 representing the draft email message may be removed from the list of items (emails 115,120,125) in the user's mailbox folder 110,145,150,155,160,170. The method ends at OPERATION 695.

According to another embodiment, items in a user's outbox may be provided in the user's inbox and identified as unsent items. For example, a user may be operating in an offline environment and may draft one or more emails. The user may select a send command, wherein the drafts may be saved and be listed as an unsent item in the user's mailbox folder. For example, the word "unsent" may be displayed next to the unsent draft items. Upon going back online, the unsent drafts may be sent and may be removed from the listing of items (emails 115,120,125).

Figure 7:
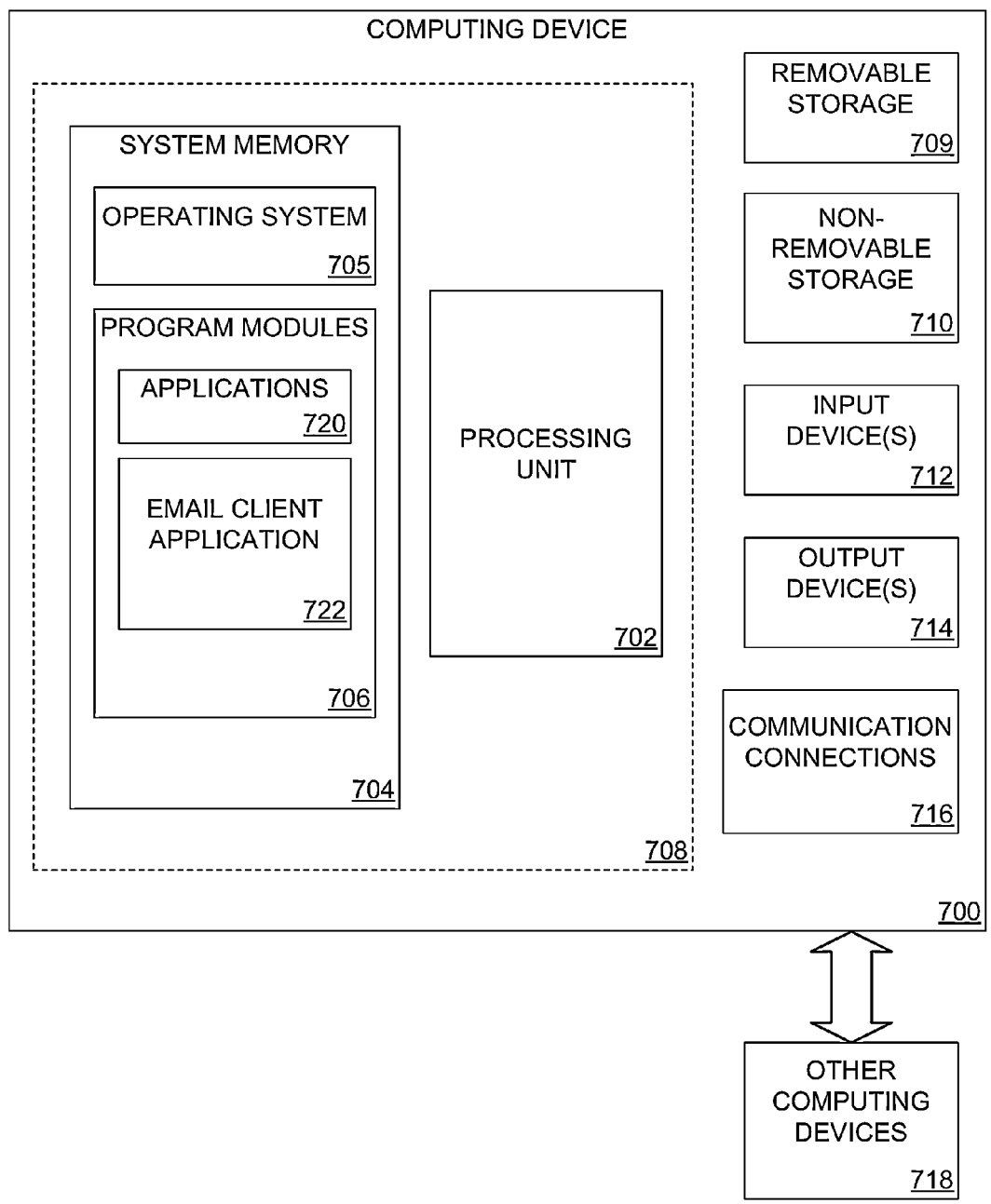
FIG. 7 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 7 through 9 and the associated descriptions provide a discussion of a variety of operating environments in which embodiments of the invention may be practiced. However, the devices and systems illustrated and discussed with respect to FIGS. 7 through 9 are for purposes of example and illustration and are not limiting of a vast number of computing device configurations that may be utilized for practicing embodiments of the invention, described herein.

FIG. 7 is a block diagram illustrating example physical components (i.e., hardware) of a computing device 700 with which embodiments of the invention may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the email client application 722. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706, such as the email client application 722 may perform processes including, for example, one or more of the stages of the method 500. The aforementioned process is an example, and the processing unit 702 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the email client application 722 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 704, the removable storage device 709, and the non-removable storage device 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 700. Any such computer storage media may be part of the computing device 700.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
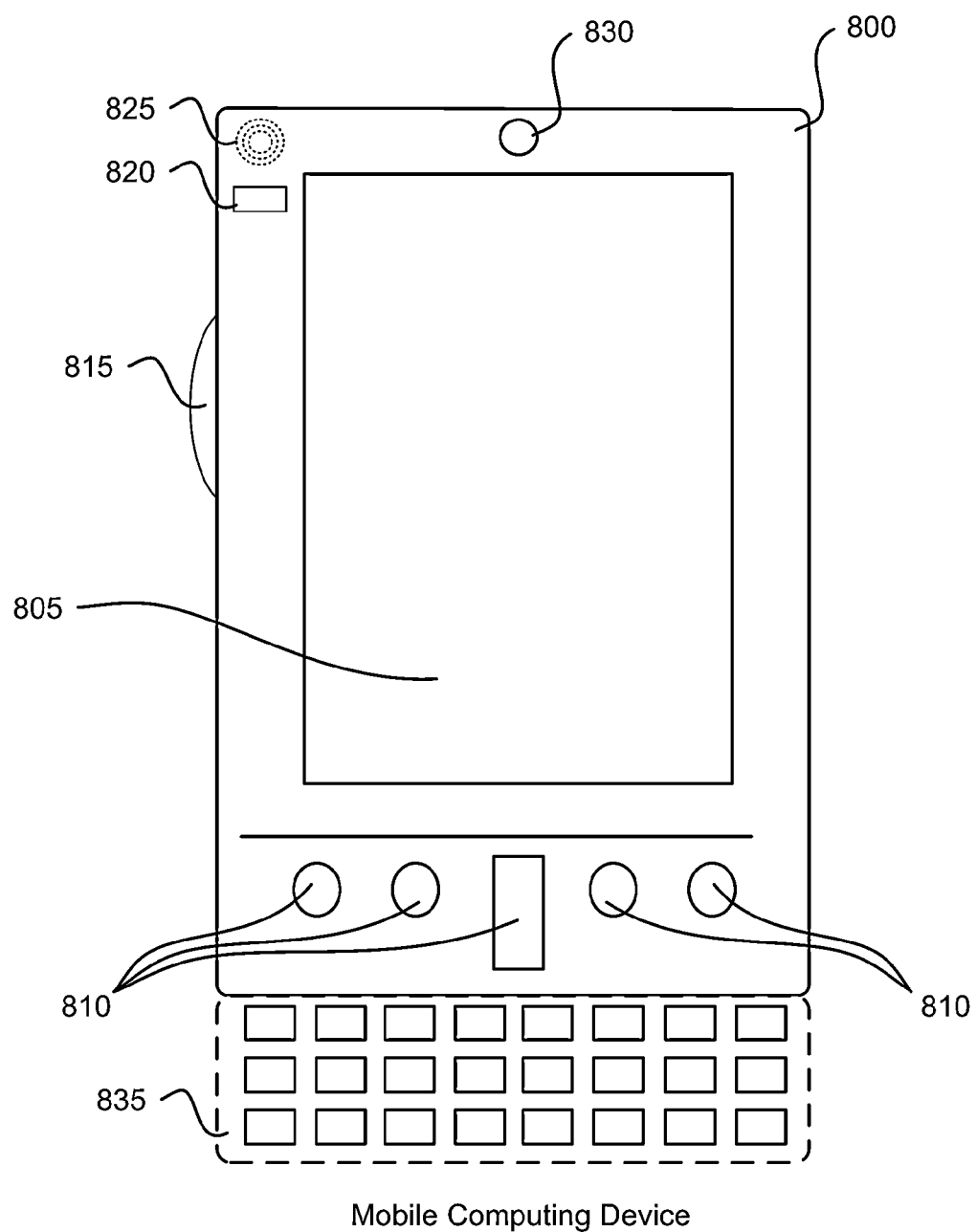
FIGS. 8A and 8B are simplified block diagrams of a mobile computing device with which embodiments of the present invention may be practiced.
Figure 8B:
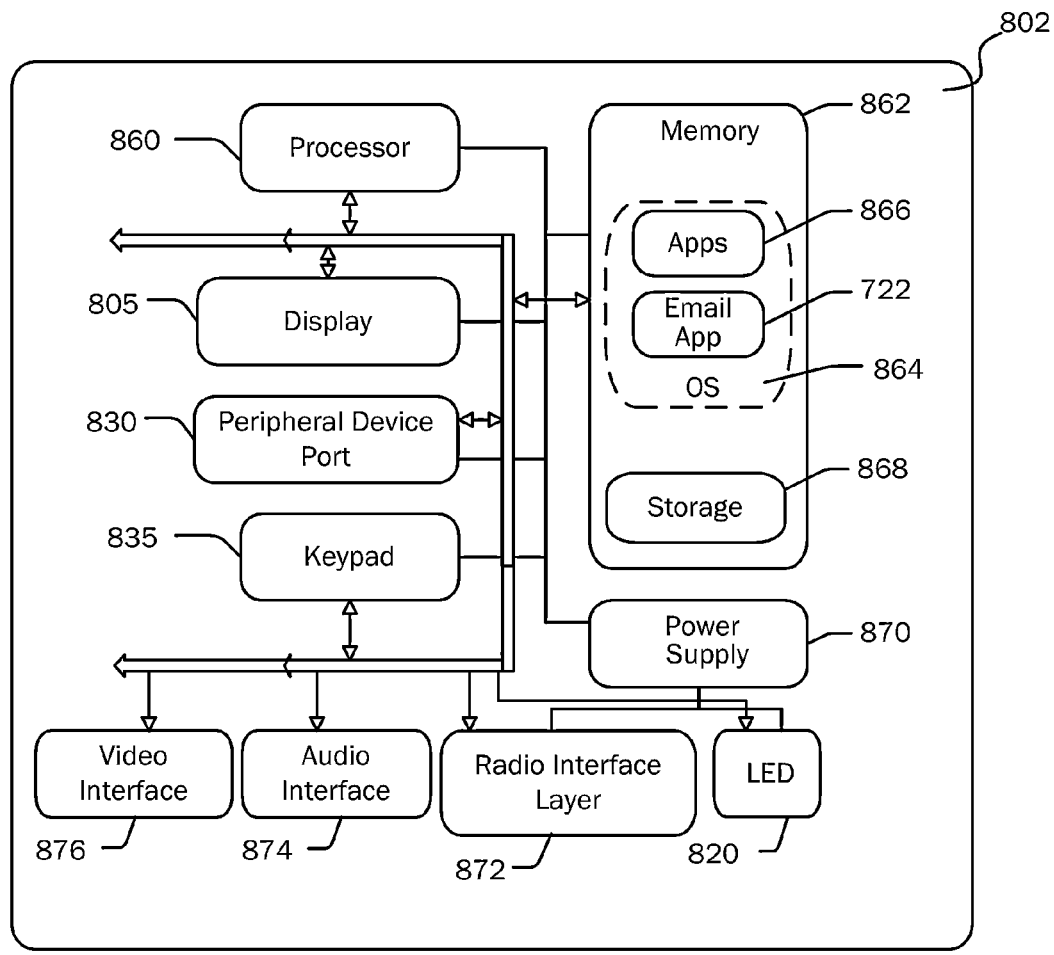
Figure 9:
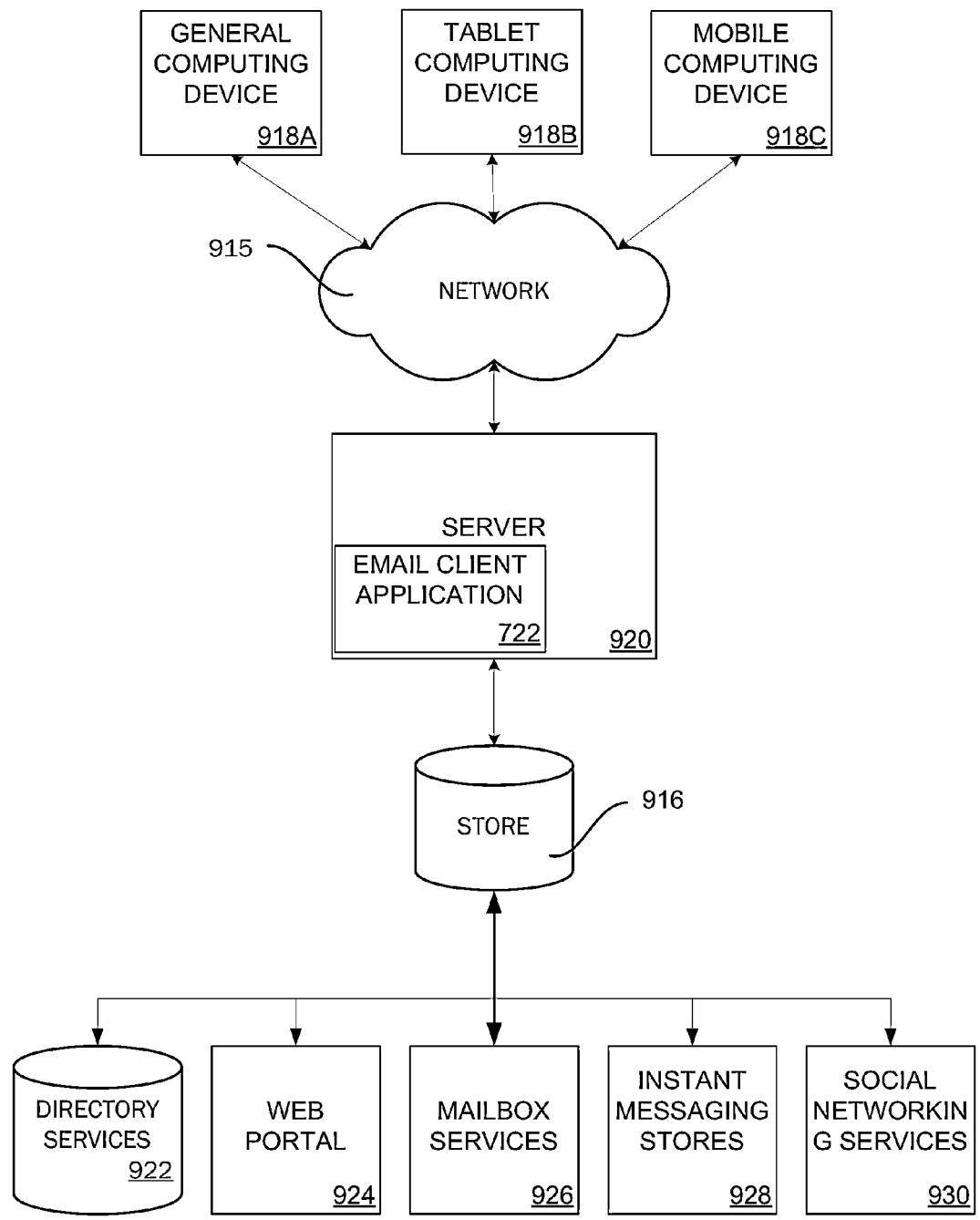
FIG. 9 is a simplified block diagram of a distributed computing system in which embodiments of the present invention may be practiced.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the email client application 722 described herein.

The system 802 has a power supply 870, which may be implemented as one or more batteries. The power supply 870 might further include an external power source, such as an AC adapter or a powered docking cradle that supplements or recharges the batteries. The system 802 may also include a radio 872 that performs the function of transmitting and receiving radio frequency communications. The radio 872 facilitates wireless connectivity between the system 802 and the "outside world", via a communications carrier or service provider. Transmissions to and from the radio 872 are conducted under control of the operating system 864. In other words, communications received by the radio 872 may be disseminated to the application programs 866 via the operating system 864, and vice versa.

The radio 872 allows the system 802 to communicate with other computing devices, such as over a network. The radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 802 provides notifications using the visual indicator 820 that can be used to provide visual notifications and/or an audio interface 874 producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868. Computer storage media may include volatile and nonvolatile, removable and non-removable media implemented in any method or technology for storage of information, such as computer readable instructions, data structures, program modules, or other data.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing the email client application 722 to one or more client devices, as described above. Content developed, interacted with or edited in association with the email client application 722 may be stored in different communication channels or other storage types. For example, various documents may be stored using a directory service 922, a web portal 924, a mailbox service 926, an instant messaging store 928, or a social networking site 930. The email client application 722 may use any of these types of systems or the like for enabling draft management for new electronic communication messages in a mailbox folder of an email client application, as described herein. A server 920 may provide the email client application 722 to clients. As one example, the server 920 may be a web server providing the email client application 722 over the web. The server 920 may provide the email client application 722 over the web to clients through a network 915. By way of example, the client computing device 918 may be implemented as the computing device 900 and embodied in a personal computer 918a, a tablet computing device 918b and/or a mobile computing device 918c (e.g., a smart phone). Any of these embodiments of the client computing device 918 may obtain content from the store 916. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method for providing management of draft electronic communication messages, the method comprising:

receiving an indication of a selection to create an email message, wherein the email message is not part of a conversation;
saving a draft of the email message;
displaying an aggregated listing of email message items including a draft item for the draft email message and a plurality of email message items from other mailbox folders;
receiving an indication of a selection of the draft item;
displaying the draft email message inline with the aggregated listing of email message items, wherein the draft email message is listed in the aggregated listing of email message items according to a method of organization applied to draft email messages and non-draft messages that are listed in the aggregated listing of email message items, wherein the non-draft messages include at least one of sent email message items and received email message items from the other mailbox folders; and
providing one or more selection controls to sort the aggregated listing by one or more classifications, wherein selection of a draft classification causes the aggregated listing to be updated to only display draft email message items.

2. The method of claim 1, further comprising:
receiving an indication of a selection to perform another task; and
continuing to include the draft item of the draft email message in the aggregated listing of email message items in one or more mailbox folders.

3. The method of claim 2, wherein receiving an indication of a selection of the draft email message further comprising:
receiving an indication to:
save the draft email message;
send the draft email message; or
delete the draft email message;
when an indication to save the draft email message is received, saving the draft email message and updating the draft item of the draft email message in the aggregated listing of email message items in the one or more mailbox folders;
when an indication to send the draft email message is received, sending the draft email message and removing the draft item of the draft email message from the aggregated listing of email message items in the one or more mailbox folders; and
when an indication to delete the draft email message is received, deleting the draft email message and removing the draft item of the draft email message from the aggregated listing of email message items in the one or more mailbox folders.

4. The method of claim 3, wherein saving a draft of the email message comprises saving a draft of the email message after one of:
receiving an indication of a selection to create an email message;
receiving an indication of a selection to save the email message;
receiving an indication of a selection to close the email message;
receiving an indication of a selection to perform another task; or
receiving an indication of an elapse of a predetermined about of time after receiving an indication of an selection to create an email message.

5. The method of claim 4, wherein saving a draft of the email message comprises saving the draft email message to one or more of:
- a drafts folder;
- an inbox folder;
- a mailbox folder;
- an aggregated folder comprising contents of a drafts folder and an inbox folder; or
- an aggregated folder comprising contents of a drafts folder and a mailbox folder.

6. The method of claim 1, wherein including a draft item of the draft email message in the aggregated listing of email message items in one or more mailbox folders comprises including an identifier distinguishing the draft email message as a draft.

7. The method of claim 6, wherein including an identifier distinguishing the draft email message as a draft comprises including a word "draft" in the draft item.

8. The method of claim 1, wherein the method of organization comprises listing the draft item in an order in which it is created and when new messages are received or moved to the one or more mailbox folders.

9. The method of claim 1, wherein the method of organization comprises listing the draft item at a beginning of the aggregated listing of email message items in the one or more mailbox folders.

10. The method of claim 1, further comprising receiving an indication of a selection of a selection control associated with the draft classification and providing a display of only the draft email message items.

11. A system for providing management of draft electronic communication messages, the system comprising:
- a memory storage; and
- a processing unit coupled to the memory storage, wherein the processing unit is operable to:
  - receive an indication of an selection to create an email message;
  - save a draft of the email message;
  - displaying an aggregated listing of email message items including a draft item of the draft email message and a plurality of non-draft email messages;
  - receiving an indication of a selection of the draft item; and
  - displaying the draft email message inline with the aggregated listing of email message items, wherein the draft email message is listed in the aggregated listing of email message items according to a method of organization applied to draft email messages and non-draft messages that are listed in the aggregated listing of email message items, wherein the non-draft messages include at least one of sent email message items and received email message items from the other mailbox folders; and
  - providing one or more selection controls to sort the aggregated listing by one or more classifications, wherein selection of a draft classification causes the aggregated listing to be updated to only display draft email message items.

12. The system of claim 11, wherein the processing unit is further operable to:
- receive an indication of a selection to perform another task; and
- continue to include the draft item of the draft email message in the aggregated listing of email message items in the one or more mailbox folders.

13. The system of claim 11, wherein the processing unit is further operable to:
- receive an indication of a selection of the draft email message;
- receive an indication to:
  - save the draft email message;
  - send the draft email message; or
  - delete the draft email message;
- when an indication to save the draft email message is received, save the draft email message and update the draft item of the draft email message in the aggregated listing of email message items in the one or more mailbox folders;
- when an indication to send the draft email message is received, send the draft email message and remove the draft item of the draft email message from the aggregated listing of email message items in the one or more mailbox folders; and
- when an indication to delete the draft email message is received, delete the draft email message and remove the draft item of the draft email message from the aggregated listing of email message items in the one or more mailbox folders.

14. The system of claim 13, wherein the processing unit is further operable to:
- save a draft of the email message to one or more of:
  - a drafts folder;
  - an inbox folder;
  - a mailbox folder;
  - an aggregated folder comprising contents of a drafts folder and an inbox folder; or
  - an aggregated folder comprising contents of a drafts folder and a mailbox folder; and
- save a draft of the email message upon receiving an indication of one of:
  - a selection to create an email message;
  - a selection to save the email message;
  - a selection to close the email message;
  - a selection to perform another task; or
  - an elapse of a predetermined about of time after receiving an indication of a selection to create an email message.

15. The system of claim 11, wherein the draft item of the draft email message in the aggregated listing of email message items in one or more mailbox folders comprises an identifier distinguishing the draft email message as a draft.

16. The system of claim 11, wherein the method of organization comprises sorting the draft items and the non-draft messages are sorted from newest to oldest.

17. A computer readable storage device having computer-executable instructions for providing management of draft electronic communication messages comprising:
- receiving an indication of an selection to create an email message;
- saving a draft item of the email message in a draft mailbox folder;
- displaying an aggregated listing of email message items including the draft item of the email message and a plurality of email message items from one or more other mailbox folders; receiving an indication of a selection to perform another task;
- continuing to include the draft item of the draft email message in the aggregated listing of email message items;
- receiving an indication of a selection of the draft email message;
- displaying the draft email message inline with the aggregated listing of email message items, wherein the draft email message is listed in the aggregated listing of email message items according to a method of organization applied to draft email messages and the plurality of email message items from the one or more other mailbox folders displayed in the aggregated listing;

receiving an indication to:
- save the draft email message;
- send the draft email message; or
- delete the draft email message;

when an indication to save the draft email message is received, saving the draft email message and updating the draft item of the draft email message in the aggregated listing of email message items;

when an indication to send the draft email message is received, sending the draft email message and removing the draft item of the draft email message from the aggregated listing of email message items; and when an indication to delete the draft email message is received, deleting the draft email message and removing the draft item of the draft email message from the aggregated listing of email message items; and providing one or more selection controls to sort the aggregated listing by one or more classifications, wherein selection of a draft classification causes the aggregated listing to be updated to only display draft email message items.

18. The computer readable storage device of claim 17, wherein including a draft item of the draft email message in the aggregated listing of email message items comprises:

receiving an indication of a selection of a selection control associated with the draft classification; and providing a display of only the draft email message items.

19. The computer readable storage device of claim 17, wherein the plurality of email message items from the one or more other mailbox folders comprise a plurality of email message items from an inbox folder.

20. The computer readable storage device of claim 17, wherein receiving an indication of a selection of a selection control associated with the draft classification causes a drop down listing of only the draft email message items to be displayed.

* * * * *